United States Patent
Uenosono (10) Patent No.: US 7,478,951 B2
(45) Date of Patent: Jan. 20, 2009

(54) HYDRODYNAMIC BEARING DEVICE, SPINDLE MOTOR INCLUDING THE SAME, AND RECORDING AND REPRODUCING APPARATUS

(75) Inventor: Kaoru Uenosono, Ehime (JP)

(73) Assignee: Panasonic Corporation, Osaka (JP)

( * ) Notice: Subject to any disclaimer, the term of this patent is extended or adjusted under 35 U.S.C. 154(b) by 344 days.

(21) Appl. No.: 11/394,225

(22) Filed: Mar. 31, 2006

(65) Prior Publication Data

US 2006/0222276 A1    Oct. 5, 2006

(30) Foreign Application Priority Data

Mar. 31, 2005    (JP)    ............... 2005-100321

(51) Int. Cl.
*F16C 32/06*    (2006.01)
(52) U.S. Cl. ........................... 384/107
(58) Field of Classification Search ......... 384/100–124; 360/99.08, 98.07
See application file for complete search history.

(56) References Cited

U.S. PATENT DOCUMENTS 6,519,113 B1 * 2/2003 Boutaghou ............... 360/99.08
6,843,602 B2 * 1/2005 Koseki et al. ............... 384/100
7,092,203 B2 * 8/2006 Inoue et al. .................. 384/107
2003/0048575 A1 * 3/2003 Nishimura et al. ........ 360/99.08
2005/0069232 A1 * 3/2005 Aiello et al. ................ 384/100

FOREIGN PATENT DOCUMENTS

JP    2000350408 A    12/2000

* cited by examiner

*Primary Examiner*—Thomas R Hannon
(74) *Attorney, Agent, or Firm*—Steptoe & Johnson LLP (57) ABSTRACT

A cylindrical sleeve is rotatably fitted over a fixed shaft erected on a base, the sleeve including an outer collar part at an outer periphery of the lower end portion thereof, a slip-out preventing member for preventing the slip-out from the fixed shaft while allowing the sleeve to rotate is provided on the base, the slip-out preventing member including an inner collar part that engages with the outer collar part in the slip-out direction. A hub is provided on the upper end portion of the sleeve, a pair of upper and lower radial bearings formed with a dynamic pressure generating groove are provided on the inner peripheral surface of the sleeve, and a thrust bearing formed with a dynamic pressure generating groove is provided at the lower end face of the sleeve.

10 Claims, 11 Drawing Sheets

HYDRODYNAMIC BEARING DEVICE, SPINDLE MOTOR INCLUDING THE SAME, AND RECORDING AND REPRODUCING APPARATUS

BACKGROUND OF THE INVENTION

1. Field of the Invention

The present invention relates to a hydrodynamic bearing device used in a spindle motor such as a small HDD (Hard Disc Drive) motor of, for example, not more than one inch, a spindle motor including the hydrodynamic-bearing device, and a recording and reproducing apparatus mounted with the spindle motor.

2. Description of the Related Art

Figure 10:
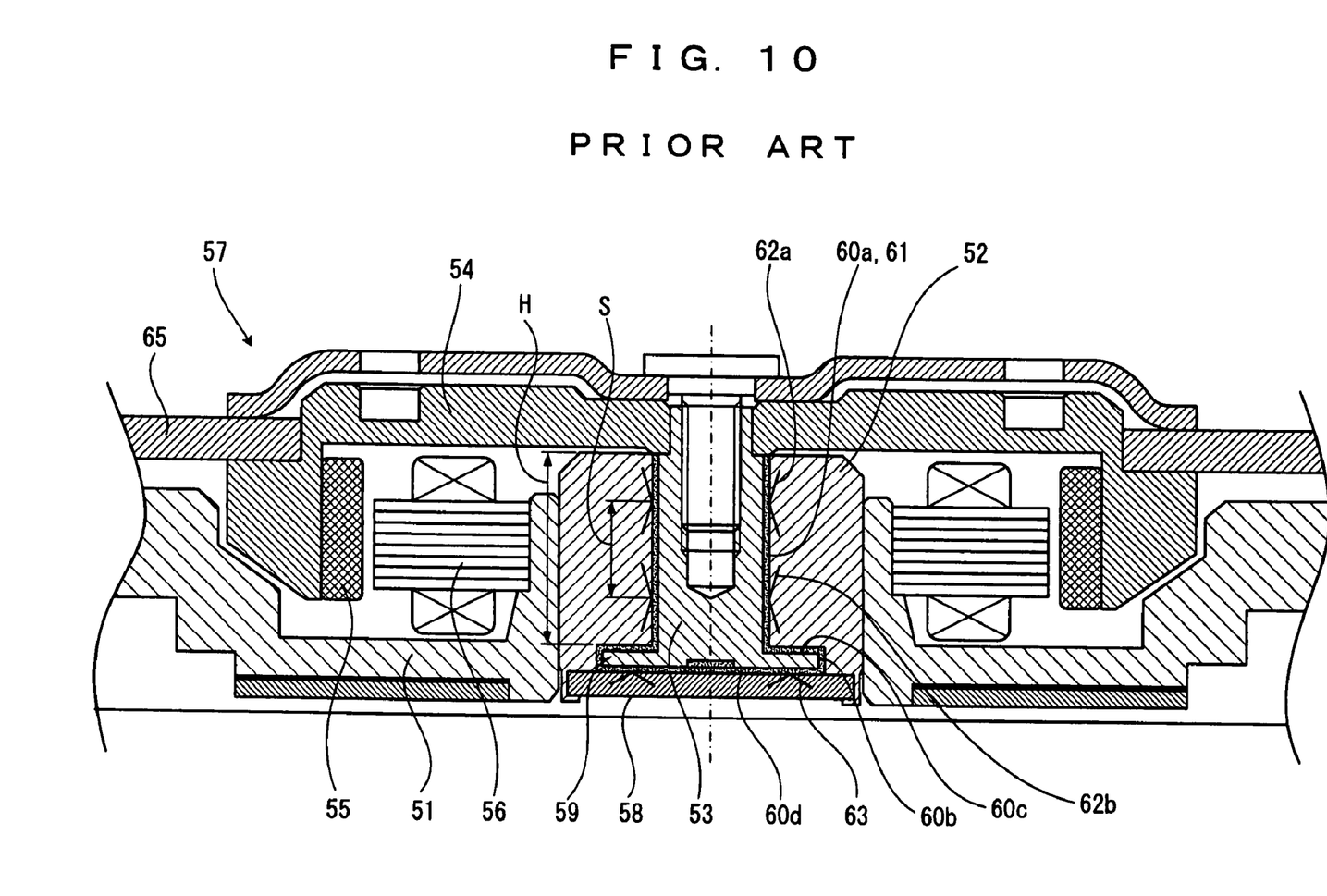
FIG. 10 is a cross sectional view of a conventional shaft rotation type spindle motor.

In recent years, with entry of HDDs into AV (Audio Visual) products and home electrical products, the spindle motors are required to be compact, thin, highly accurate and have long life spans. In FIG. 10 showing a configuration of the spindle motor 57, a sleeve 52 is provided on a base 51, a rotating shaft 53 is inserted into the sleeve 52, and a hub 54 for receiving a disc 65 is attached to a distal end of the rotating shaft 53, which hub 54 is provided with a magnet 55. A stator 56 wound with coil is provided facing the inner peripheral side of the magnet 55.

The hydrodynamic bearing is adopted as the bearing for higher accuracy and longer life span of the spindle motor 57. That is, a thrust plate 58 that receives a thrust load acting on the rotating shaft 53 is provided at the lower end portion of the sleeve 52. A flange part 59 having a diameter larger than the rotating shaft 53 is provided at the far end portion of the rotating shaft 53. The flange part 59 prevents the rotating shaft 53 from slipping out upward from the sleeve 52 and configures the thrust bearing.

An operating oil which is an operating fluid is filled to each of a gap 60a formed between the outer peripheral surface of the rotating shaft 53 and the inner peripheral surface of the sleeve 52, a gap 60b formed between the outer peripheral surface of the flange part 59 and the inner peripheral surface of the sleeve 52, a gap 60c formed between an upper surface of the flange part 59 and a lower surface of the sleeve 52 facing the upper surface of the flange part 59, and a gap 60d formed between the lower surface of the flange part 59 and the upper surface of the thrust plate 58.

A pair of upper and lower radial bearing parts 62a and 62b formed with a dynamic pressure generating groove are provided in a direction of the shaft center at the inner peripheral surface of the sleeve 52. A main thrust bearing part 63 formed with the dynamic bearing groove is provided on the upper surface of the thrust plate 58. An auxiliary thrust bearing part (not shown) formed with the dynamic bearing groove is provided on the upper surface of the flange part 59. In the spindle motor 57 configured as above, the rotating shaft 53 rotates and further the hub 54 rotates by sequentially energizing the coil.

However, the height limit of the motor 57 is becoming more severe to miniaturize and thin the motor 57. With the hydrodynamic bearing of the shaft rotation type motor 57 shown in FIG. 10, the formable height H of the radial bearing parts 62a and 62b is reduced by the thickness of the flange part 59 due to the arrangement of the flange part 59 to prevent slip out. Therefore, the spacing S (span) in the vertical direction between the upper (one) radial bearing part 62a and the lower (other) radial bearing part 62b and the bearing length are shortened without being sufficiently secured, thereby lowering the stiffness with respect to impact.

Figure 11:
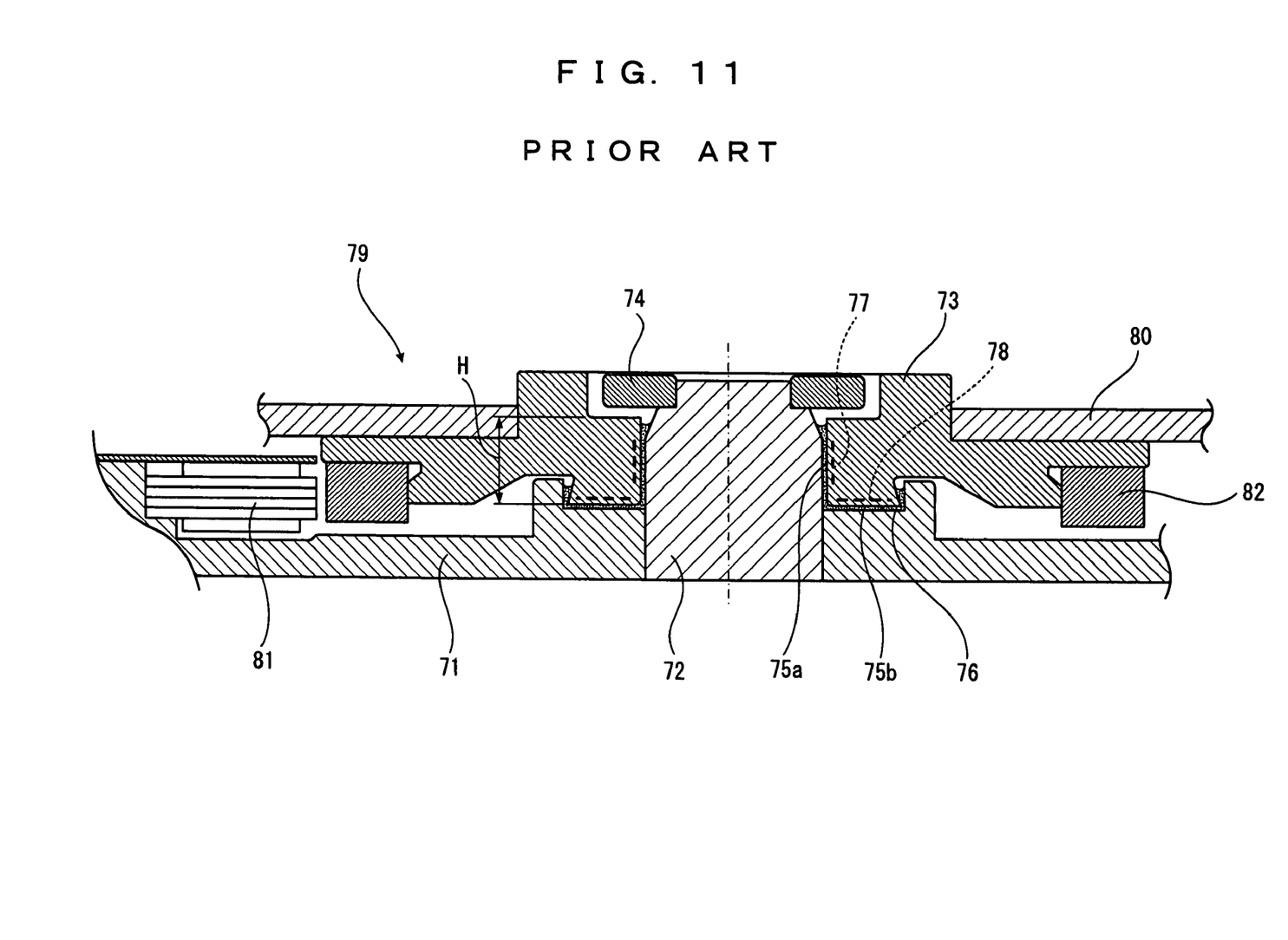
FIG. 11 is a cross sectional view of a conventional shaft fixed type spindle motor.

FIG. 10 shows the shaft rotation type motor 57, whereas FIG. 11 shows the shaft fixed type motor. A bracket 71 is provided upright on the fixed shaft 72. A freely rotating rotor hub 73 that receives the disc 80 is externally fitted to the fixed shaft 72. A ring shaped member 74 for preventing the rotor hub 73 from slipping out upward from the fixed shaft 72 is attached to the upper end portion of the fixed shaft 72.

Lubricating oil 76 which is the operating fluid is filled into a space 75a formed between the inner peripheral surface of the rotor hub 73 and the outer peripheral surface of the fixed shaft 72, and a space 75b formed between the lower end face of the rotor hub 73 and the upper surface of the bracket 71. A radial bearing part 77 formed with the dynamic pressure generating groove is provided on the inner peripheral surface of the rotor hub 73. A thrust bearing part 78 formed with the dynamic pressure generating groove is provided on the lower end face of the rotor hub 73. Further, a magnet 82 is attached to the rotor hub 73. In the spindle motor configured as above, the rotor hub 73 rotates by sequentially energizing the coil of the stator 81.

However, in the hydrodynamic bearing device of the shaft fixed type motor 79 shown in FIG. 11, the formable height H of the radial bearing part 77 is reduced by the thickness of the ring shaped member 74 due to the arrangement of the ring shaped member 74 to prevent slip out, thereby lowering the stiffness with respect to vibration and impact.

SUMMARY OF THE INVENTION

Therefore, the present invention aims to provide a hydrodynamic bearing device that can sufficiently secure the formable height of a radial bearing and that can ensure a sufficiently long spacing (span) between each radial bearings when a plurality of radial bearings are provided in the direction of the shaft center, and to provide a spindle motor including the hydrodynamic bearing device as well as a recording and reproducing apparatus mounted with the spindle motor.

A first aspect of the invention relates to a hydrodynamic bearing device comprising a shaft, a shaft side member fixed to one end portion of the shaft, a bearing body externally fitted to the shaft in a freely rotating manner, a bearing body side member fixed to the bearing body, at least one radial bearing having a radial dynamic pressure generating groove, formed on at least one of an outer peripheral surface of the shaft and an inner peripheral surface of the bearing body, and a thrust bearing formed having a thrust dynamic pressure generating groove, formed on at least one of one end face of the bearing body in a direction of a shaft center of the bearing body and a surface of the shaft side member facing the end face, the radial bearing and the thrust bearing being communicated, the radial bearing and the thrust bearing being filled with an operating fluid. Herein, the hydrodynamic bearing device further comprises a slip-out preventing device for preventing the bearing body from slipping out from the other end portion of the shaft while allowing the bearing body to rotate, the slip-out preventing device including a movable side engaging part formed on the outer peripheral surface of the bearing body and a fixed side engaging part fixed on the shaft side member, the movable side engaging part being engageable with the fixed side engaging part in a slip-out direction of the bearing body.

According to such configuration, when the bearing body is rotated, the bearing side member is rotated along with the bearing body, the radial load is supported by the radial bearing, and the thrust load is supported by the thrust bearing. When the bearing body attempts to move in the slip-out direction, the movable side engaging part engages the fixed side engaging part while rotating, thereby preventing the bearing body from slipping out.

Thus, the slip-out prevention of the bearing body is performed by the movable side engaging part formed on the outer peripheral surface of the bearing body, and the fixed side engaging part fixed on the shaft side member. Therefore, even if the slip-out preventing device is provided, the formable height of the radial bearing at the inner periphery of the bearing body or the outer periphery of the shaft is not reduced and the formable height of the radial bearing is secured to a sufficient size. When a plurality of radial bearings are provided in the direction of the shaft center of the shaft and the like, the spacing (span) between each radial bearings or the bearing length are secured to a sufficiently size, and stiffness with respect to disturbances such as vibration and impact is enhanced.

In the hydrodynamic bearing device according to the second aspect of the invention, the shaft is a fixed shaft, the shaft side member is a base, the bearing body is a cylindrical sleeve, and the bearing body side member is a hub provided on the other end portion of the sleeve; a first gap is formed between the inner peripheral surface of the sleeve and the outer peripheral surface of the fixed shaft; a second gap communicating to one end portion of the first gap is formed between one end face of the sleeve and a surface of the base facing the one end face of the sleeve; the operating fluid is filled into the first and the second gaps; the radial dynamic pressure generating groove is formed on at least one of the inner peripheral surface of the sleeve and the outer peripheral surface of the fixed shaft; the thrust dynamic pressure generating groove is formed on at least one of one end face of the sleeve and the surface of the base facing the one end face of the sleeve; the sleeve includes an outer collar part on one end of the outer peripheral surface as the movable side engaging part; an annular slip-out preventing member is provided on the base; the slip-out preventing member includes an inner collar part on the inner peripheral part as the fixed side engaging part; an annular inner groove is formed between the inner collar part and the base; and the outer collar part is fitted into the inner groove in a freely rotating manner.

Therefore, when the sleeve is rotated, the hub is rotated with the sleeve, the radial load is supported by the radial bearing and the thrust load is supported by the thrust bearing. When the sleeve attempts to move in the slip-out direction, the outer collar part engages the inner collar part while rotating in a state fitted into the inner groove, and thus the slip-out of the sleeve is prevented.

Therefore, the slip-out prevention of the sleeve is performed by the outer collar part formed at one end of the outer peripheral surface of the sleeve and the inner collar part of the slip-out preventing member provided on the base. Thus even if the outer collar part and the inner collar part are provided, the formable height of the radial bearing at the inner periphery of the sleeve or the outer periphery of the fixed shaft is not reduced and the formable height of the radial bearing can be secured to a sufficient size.

In the hydrodynamic bearing device according to the third aspect of the invention, a third gap communicating to the second gap is formed between the outer collar part of the sleeve and the inner peripheral surface of the slip-out preventing member; the hub is formed with a penetration hole; the fixed shaft is inserted into the penetration hole; the hub includes a cover part for covering the other end face of the sleeve along the periphery of the penetration hole; a fourth gap communicating to the other end portion of the first gap is formed between the cover part and the other end face of the sleeve; and the operating fluid is filled in the third and fourth gaps.

In the hydrodynamic bearing device according to the fourth aspect of the invention, a communication hole communicating to the second gap and the fourth gap is formed in the sleeve, and the operating fluid is filled in the communication hole.

Therefore, the operating fluid pressure in the second gap and the operating fluid pressure in the fourth gap are balanced by the communication hole, and further, the second and fourth gaps are communicated to the first gap. Thus, the pressure difference between the thrust bearing in the second gap and the radial bearing in the first gap is reduced, and leakage of the operating fluid is prevented.

In the hydrodynamic bearing device according to the fifth aspect of the invention, an inclined surface facing the inner peripheral surface of the inner collar part from the inner side in the radial direction is formed on the outer peripheral surface of the sleeve; the inclined surface having the outer diameter gradually increasing towards the base side and reaching the outer collar part; a fifth gap is formed between the inner peripheral surface of the inner collar part and the inclined surface of the sleeve; the fifth gap having a width gradually narrowing in the radial direction from an open end on the hub side of the slip-out preventing member towards the base side; the fifth gap communicating to the third gap at the base side thereof; and an interface of the operating fluid is present in the fifth gap.

Therefore, since the operating fluid in the fifth gap is pushed towards the outer peripheral side by the action of the centrifugal force, the operating fluid attempts to move towards the third gap on the base side along the inclined surface of the sleeve. Further, the direction of the surface tension acting on the interface of the operating fluid in the fifth gap becomes the direction in which the area of the interface becomes smaller, that is, the direction from the open end of the hub side towards the third gap on the base side in which the fifth gap becomes gradually smaller. Consequently, the operating fluid in the fifth gap is prevented from leaking outside from the open end on the hub side.

In the hydrodynamic bearing device according to the sixth aspect of the invention, the fixed shaft includes a body shaft part, a distal end shaft part, and a stepped surface; the distal end shaft part is formed at a distal end of the body shaft part, and has a diameter smaller than the main shaft part; the stepped surface is provided consecutively between the outer peripheral surface of the main shaft part and the outer peripheral surface of the distal end shaft part; the distal end of the fixed shaft is inserted into the penetration hole of the hub; an inclined surface facing the stepped surface of the fixed shaft in the direction of the shaft center is formed at the cover part of the hub; the inclined surface inclining so as to gradually increase the inner diameter thereof towards the base side; a sixth gap is formed between the inclined surface of the hub and the stepped surface of the fixed shaft; the sixth gap communicating to the other end portion of the first gap at an outer peripheral side thereof and communicating to the penetration hole of the hub at an inner peripheral side thereof; the sixth gap having a width gradually narrowing in the direction of the shaft center from the inner peripheral side towards the outer peripheral side; and an interface of the operating fluid is present in the sixth gap.

Therefore, since the operating fluid in the sixth gap is pushed towards the outer peripheral side by the action of the centrifugal force, the operating fluid attempts to move towards the other end portion of the first gap. Further, the direction of the surface tension acting on the interface of the operating fluid in the sixth gap becomes the direction in which the area of the interface becomes smaller, that is, the direction from the inner peripheral side to the outer peripheral side (i.e., from penetration hole of the hub to the other end portion of the first gap) in which the sixth gap becomes gradually smaller. Consequently, the operating fluid in the sixth gap is prevented from leaking outside from the pass through hole of the hub.

In the hydrodynamic bearing device according to the seventh aspect of the invention, the interface of the operating fluid present in the fifth gap is balanced with the pressure inside the bearing by surface tension and centrifugal force when the sleeve is rotating.

In the hydrodynamic bearing device according to the eighth aspect of the invention, the interface of the operating fluid present in the sixth gap is balanced with the pressure inside the bearing by surface tension and centrifugal force when the sleeve is rotating.

In the hydrodynamic bearing device according to the ninth aspect of the invention, the radial dynamic pressure generating groove of at least one radial bearing has an asymmetrical shape that generates a dynamic pressure for circulating the operating fluid from the first gap through the fourth gap, the communication hole, the second gap, and again to the first gap in this order.

Therefore, the formable height of the radial bearing at the inner periphery of the sleeve or the periphery of the fixed shaft is secured to a sufficient size, and thus the spacing (span) between each radial bearings is secured to a sufficient size.

In the hydrodynamic bearing device according to the tenth aspect of the invention, a thrust bearing formed with a thrust dynamic pressure generating groove is provided on at least one of the surfaces of the outer collar part of the sleeve and the inner collar part of the slip-out preventing member, the surfaces facing each other in the direction of the shaft center.

Therefore, the thrust load acting in the slip-out direction of the sleeve is supported by the thrust bearing formed on one of the surfaces of the outer collar part of the sleeve or the inner collar part of the slip-out preventing member. Further, the thrust load acting in the direction opposite the slip-out direction of the sleeve is supported by the thrust bearing formed on one of the surfaces of the one end face of the sleeve or the surface of the base.

The eleventh aspect of the invention relates to a spindle motor including the hydrodynamic bearing device according to the first aspect of the invention.

The twelfth aspect of the invention relates to a recording and reproducing apparatus including the spindle motor according to the eleventh aspect of the invention.

DESCRIPTION OF THE PREFERRED EMBODIMENTS

The present invention will now be described in detail according to the accompanying drawings.

The first embodiment of the present invention will now be explained based on FIG. 1 to FIG. 7.

Figure 1:
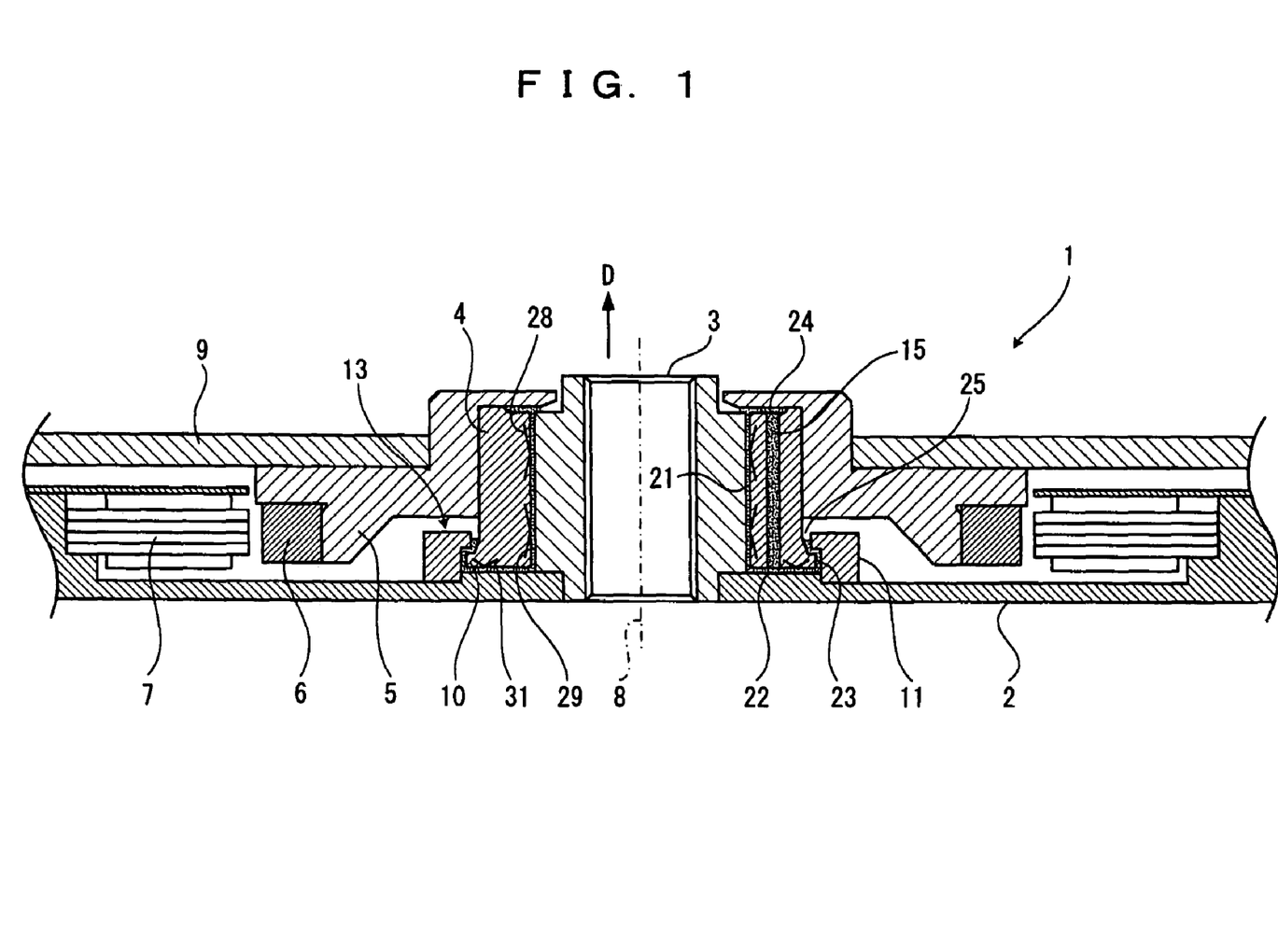
FIG. 1 is a cross sectional view of a spindle motor including a hydrodynamic bearing device according to a first embodiment of the present invention.

As shown in FIG. 1, reference character 1 is a shaft fixed type spindle motor, where a base 2 (one example of shaft side member) is attached to and fixed to one end portion of the fixed shaft 3 (one example of shaft). A cylindrical sleeve 4 (one example of bearing body) is externally fitted to the fixed shaft 3 in a freely rotating manner. The lower end portion (one end portion) of the sleeve 4 is facing the base 2. A hub 5 (one example of bearing body side member) for receiving the disc 9 is attached to the upper end portion (other end portion) of the sleeve 4. A magnet 6 is provided on the hub 5. The stator 7 facing the magnet 6 from the outer side in the radial direction is provided on the base 2.

Figure 2:
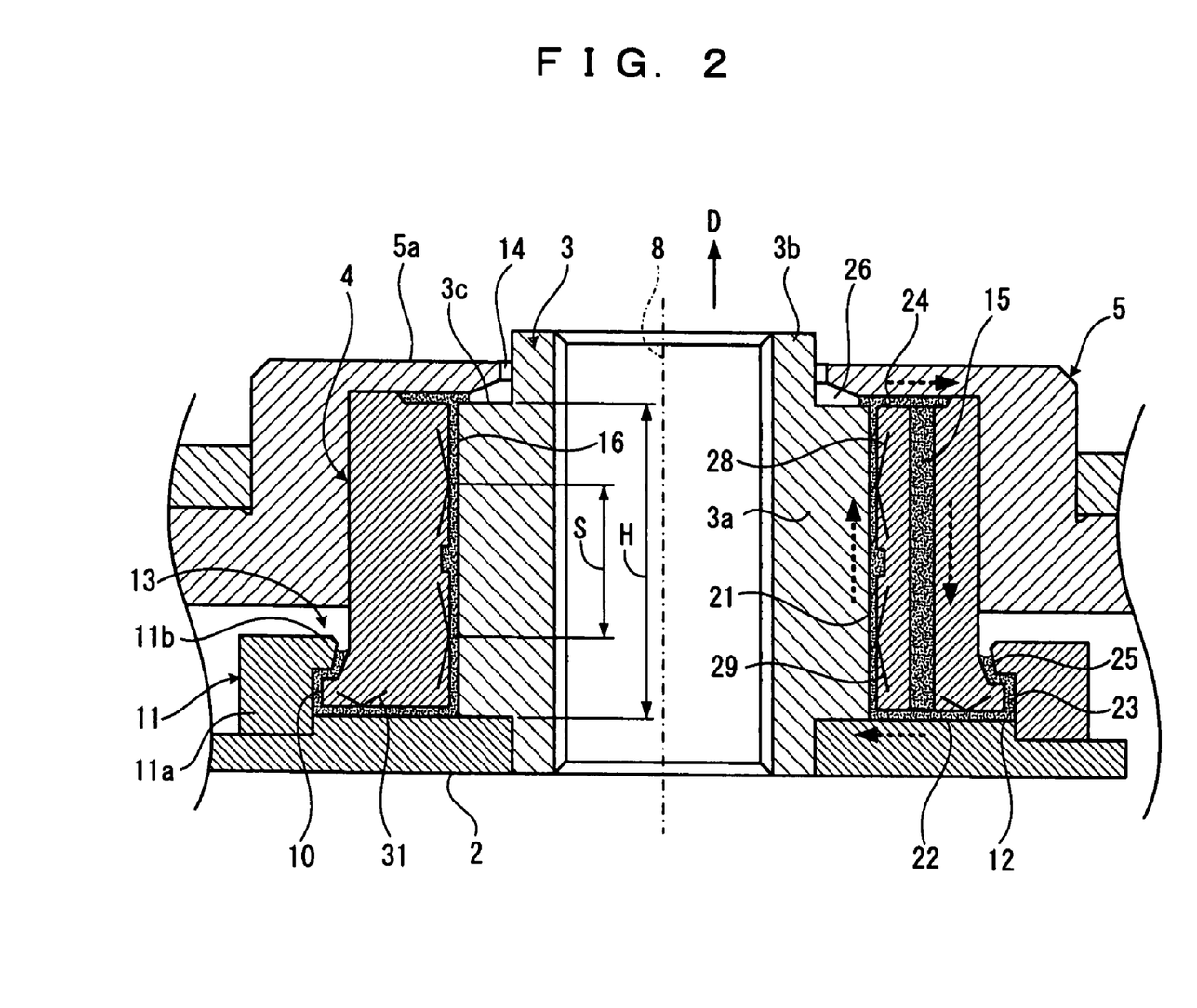
FIG. 2 is an enlarged cross sectional view of the hydrodynamic bearing device of the spindle motor.

As shown in FIG. 2, the fixed shaft 3 includes a body shaft part 3a, a distal end shaft part 3b, and a stepped surface 3c. The distal end shaft part 3b is formed at the distal end of the body shaft part 3a, and has a diameter smaller than the body shaft part 3a. The stepped surface 3c is provided consecutively between the outer peripheral surface of the body shaft part 3a and the outer peripheral surface of the distal end shaft part 3b.

A penetration hole 14 is formed in the hub 5. The distal end shaft part 3b of the fixed shaft 3 is inserted to the penetration hole 14 from below. Further, the hub 5 includes a cover 5a that covers the upper end face (other end face) of the sleeve 4 at the periphery of the penetration hole 14.

A slip-out preventing device 13 is provided on the spindle motor 1. The slip-out preventing device 13 allows the rotation of the sleeve 4 and prevents the sleeve 4 from slipping out from the upper end portion (other end portion) of the fixed shaft 3. The slip-out preventing device 13 is configured by an outer collar part 10 (one example of a movable side engaging part) formed on the sleeve 4, a slip-out preventing member 11 attached to and fixed to the base 2, and an inner collar part 11b (one example of a fixed side engaging part) formed in the slip-out preventing member 11.

Figure 4A:
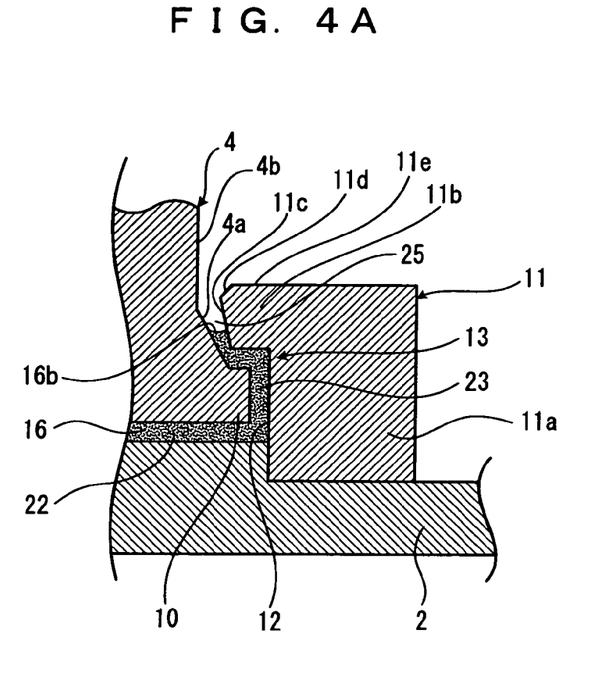
FIG. 4A is an enlarged cross sectional view of a slip-out preventing device of the sleeve of the hydrodynamic bearing device.

The outer collar part 10 is formed across the entire periphery at the lower end portion of the outer peripheral surface of the sleeve 4, and is bulged out to the outer side in the radial direction. Further, the slip-out preventing member 11 is formed into a toric shape, and the lower end portion of the sleeve 4 is inserted to the inner side of the slip-out preventing member 11. As shown in FIG. 4, the inner collar part 11b bulges out to the inner side in the radial direction from the upper part of the inner peripheral surface of the toric part 11a of the slip-out preventing member 11. Further, an annular inner groove 12 is formed at the inner periphery part of the slip-out preventing member 11. The inner groove 12 is formed between the inner collar part 11b and the base 2 that face each other in the vertical direction (direction of shaft center 8 of the fixed shaft 3). The outer collar part 10 is rotatably fitted into the inner groove 12 of the slip-out preventing member 11, and is engaged to the inner collar part 11 in the slip-out direction D of the sleeve 4.

The inner peripheral surface 11c of the inner collar part lib of the slip-out preventing member 11 is inclined so that the inner diameter gradually increases towards the base 2 side. An inclined surface 4a facing the inner peripheral surface 11c of the inner collar part 11b of the slip-out preventing member 11 from the inner side in the radial direction is formed across the entire periphery on the outer peripheral surface of the lower end portion of the sleeve 4. The inclined surface 4a is inclined up to the outer collar part 10 so that the outer diameter gradually increases towards the base 2 side.

Figure 3A:
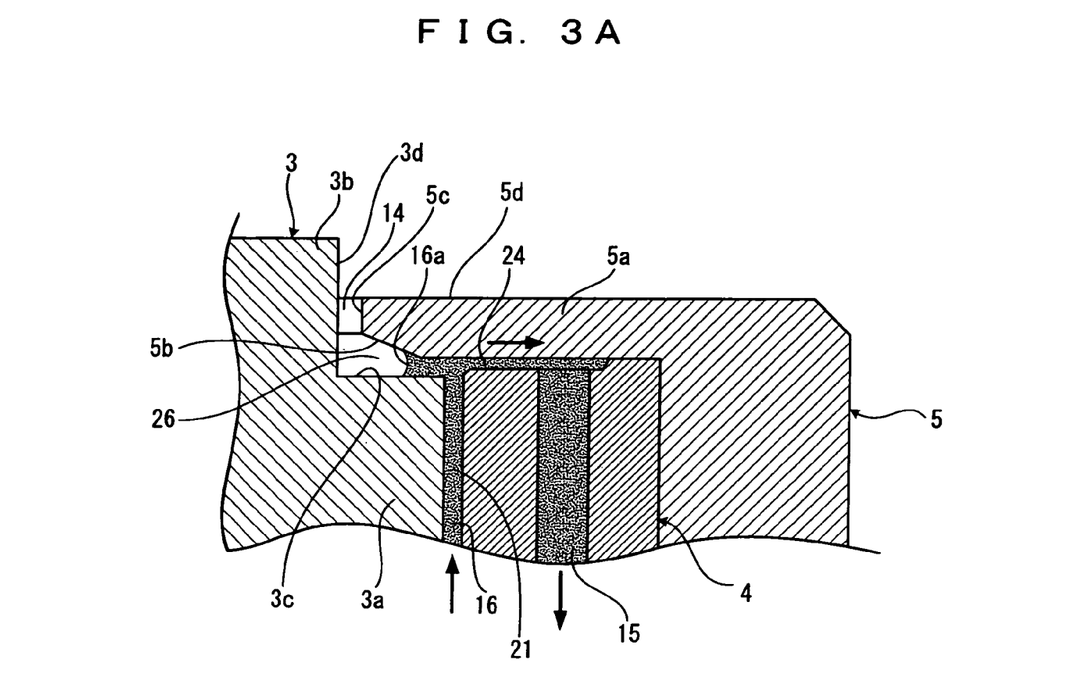
FIG. 3A is an enlarged cross sectional view of a portion around an upper end of a sleeve of the hydrodynamic bearing device.

As shown in FIG. 3, an inclined surface 5b is formed across the entire periphery at the lower surface of the cover part 5a of the hub 5. The inclined surface 5b is inclined so that the inner diameter gradually increases towards the base 2 side from the peripheral edge of the penetration hole 14, and faces the stepped surface 3c of the fixed shaft 3 positioned below in the direction of the shaft center 8.

As shown in FIG. 2, a first gap 21 is formed across the entire periphery between the inner peripheral surface of the sleeve 4 and the outer peripheral surface of the fixed shaft 3. A second gap 22 is formed across the entire periphery between the lower end face (one end face) of the sleeve 4 and the upper surface (surface) of the base 2 facing the lower end face. A third gap 23 is formed across the entire periphery between the outer collar part 10 and the inner peripheral surface of the slip-out preventing member 11. A fourth gap 24 is formed across the entire periphery between the cover part 5a of the hub 5 and the upper end face (other end face) of the sleeve 4. A fifth gap 25 is formed across the entire periphery between the inner peripheral surface 11c (refer to FIG. 4) of the inner collar part 11b of the slip-out preventing member 11 and the inclined surface 4a (refer to FIG. 4) of the sleeve 4. A sixth gap 26 is formed across the entire periphery between the inclined surface 5b (refer to FIG. 3) of the hub 5 and the stepped surface 3c (refer to FIG. 3) of the fixed shaft 3.

As shown in FIG. 4, the angles of inclination of the inclined surface 4a of the sleeve 4 and the inner peripheral surface 11c of the inner collar part 11b are different. The fifth gap 25 is inclined in the direction of the outer diameter and has the width in the radial direction gradually narrowed from the open end on the hub 5 side of the slip-out preventing member 11 towards the base 2 side. As shown in FIG. 3, the width in the direction of the shaft center 8 of the sixth gap 26 is gradually narrowed from the inner peripheral side toward the outer peripheral side due to the inclined surface 5b of the hub 5.

As shown in FIG. 2, the inner end in the radial direction of the second gap 22 communicates to the lower end portion (one end portion) of the first gap 21. The lower end portion of the third gap 23 communicates to the outer end in the radial direction of the second gap 22. The inner end in the radial direction of the fourth gap 24 communicates to the upper end portion (other end portion) of the first gap 21. The lower end side (i.e., base 2 side) of the fifth gap 25 communicates to the upper end portion of the third gap 23. The outer end in the radial direction of the sixth gap 26 communicates to the upper end portion (other end portion) of the first gap 21. The inner end in the radial direction of the sixth gap 26 communicates to the penetration hole 14 of the hub 5. Further, at least one communication hole 15 that communicates to the second gap 22 and the fourth gap 24 is formed in the sleeve 4. The operating oil 16 (one example of operating fluid) is filled into the first to the sixth gaps 21 to 26 and the communication hole 15.

Ester oil is normally used for the operating oil 16. However, it is not limited thereto, and other oils may be used. High fluidity grease or ionic fluid and the like may be alternatively used.

As shown in FIG. 3, an interface 16a at the upper part of the operating oil 16 is present on the outer peripheral side of the sixth gap 26, which part functions as the sealing part of the upper part. An oil barrier (oil repellent agent) is applied to the outer peripheral surface 3d of the distal end shaft part 3b of the fixed shaft 3 and the inner peripheral surface 5c of the cover part 5a to prevent the operating oil 16 from exuding (migrating) from inside the sixth gap 26 to the penetration hole 14. The oil barrier may attach to the stepped surface 3c, the inner peripheral surface 5c or the top surface 5d of the cover part 5a.

As shown in FIG. 4, an interface 16b at the lower part of the operating oil 16 is present in the fifth gap 25, which part functions as the sealing part of the lower part. The oil barrier is applied to the outer peripheral surface 4b of the cylindrical part of the sleeve 4 and the open corner lid or the top surface 11e of the slip-out preventing member 11 to prevent the operating oil 16 from exuding (migrating) upward from inside the fifth gap 25. The oil barrier may attach to the inclined part 4a of the sleeve 4 or the inner peripheral surface 11c of the slip-out preventing member 11.

Figure 5:
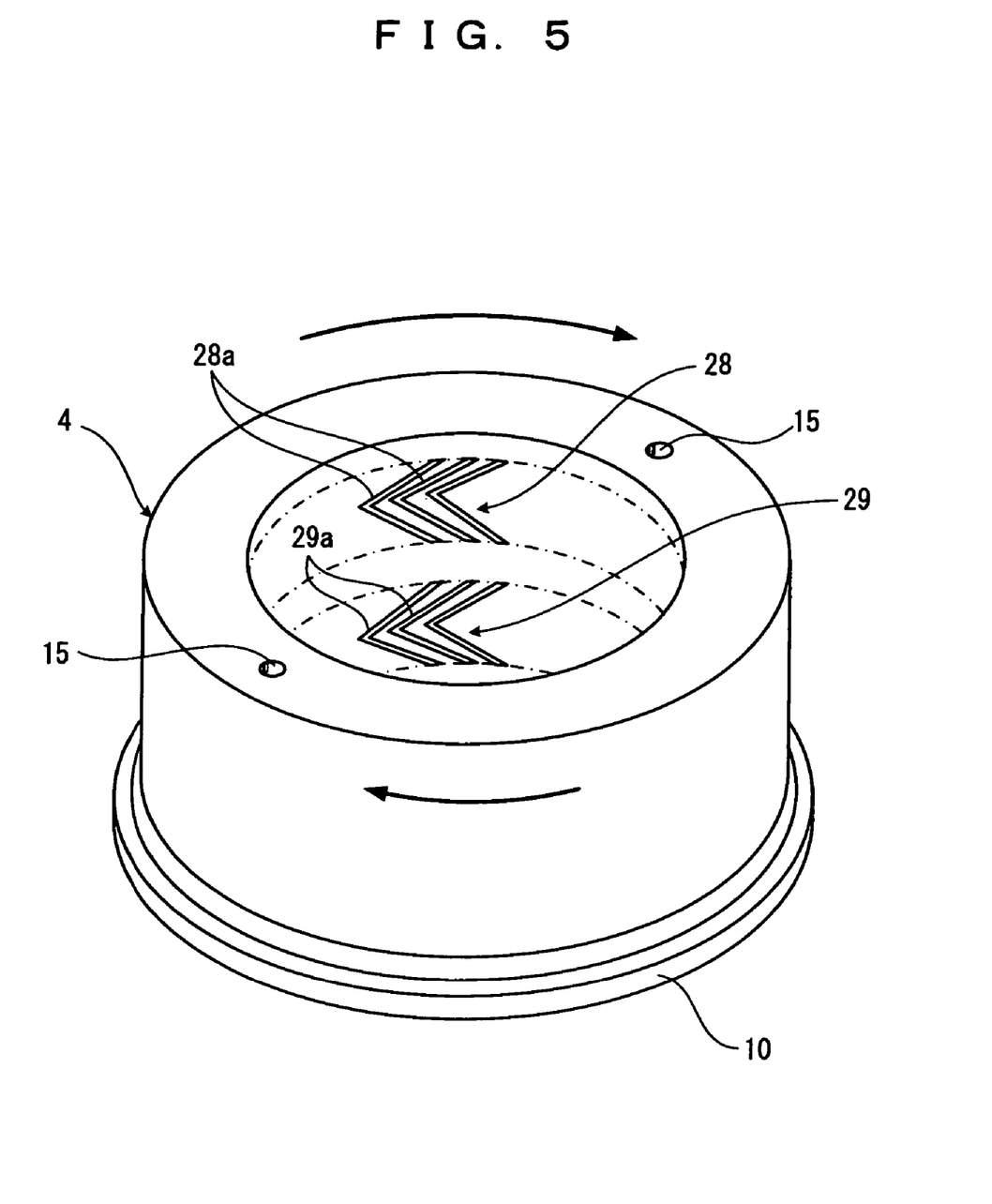
FIG. 5 is a perspective view of the sleeve of the hydrodynamic bearing device.
Figure 6:
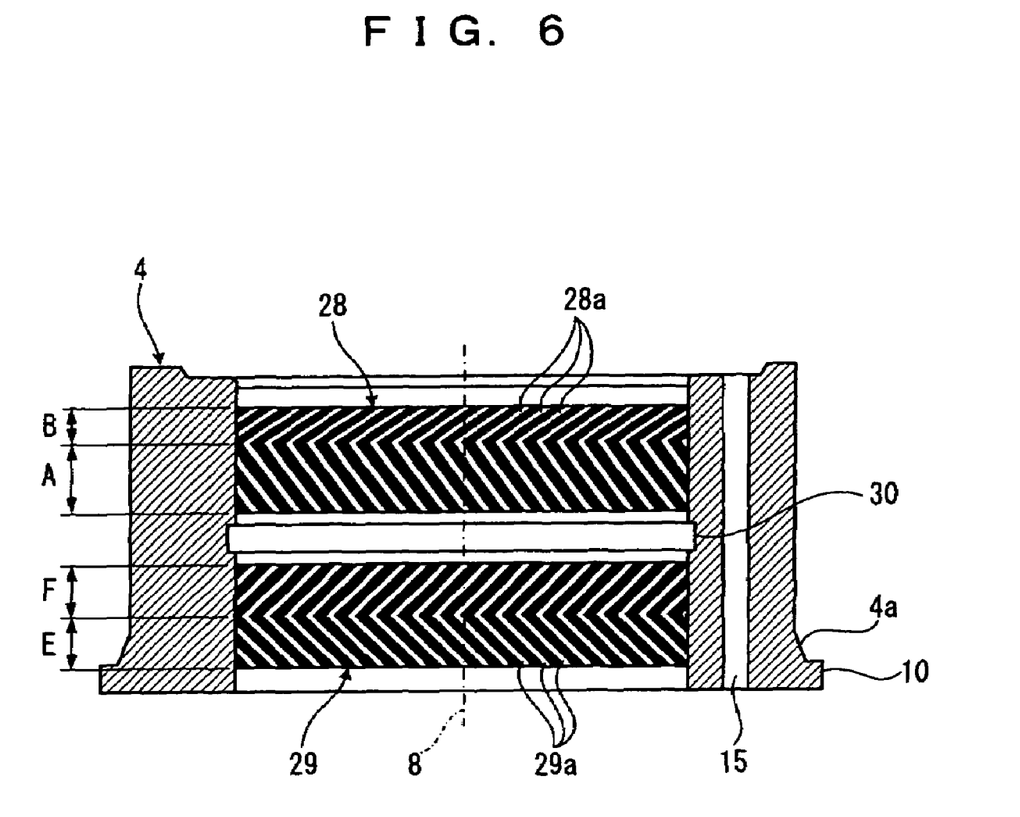
FIG. 6 is a longitudinal cross sectional view of the sleeve of the hydrodynamic bearing device.

A pair of radial bearings 28 and 29 are provided in the vertical direction (i.e., direction of shaft center 8) in the inner peripheral surface of the sleeve 4. As shown in FIG. 5 and FIG. 6, the radial bearings 28 and 29 each includes a radial dynamic pressure generating groove 28a, 29a formed on the inner peripheral surface of the sleeve 4, and generates a radial load supporting pressure through the action of the radial dynamic pressure generating grooves 28a, 29a. The radial dynamic pressure generating groove 28a of the upper radial bearing 28 is formed into a herringbone shape, and has an asymmetrical shape in which a width A from the central bending portion to the lower end portion is longer than the width B from the central bending portion to the upper end portion. The radial dynamic pressure generating groove 29a of the lower radial bearing 29 is also formed into a herringbone shape, but has a symmetrical shape in which the width E from the central bending portion to the lower end portion is the same as the width F from the central bending portion to the upper end portion.

An oil reservoir part 30 is formed on the inner peripheral surface of the sleeve 4 and in the vertical direction between the pair of radial bearings 28, 29.

Two radial bearings 28 and 29 are provided in the vertical direction, but only one may be provided. The radial dynamic pressure generating grooves 28a, 29a may be of spiral shape.

Figure 7A:
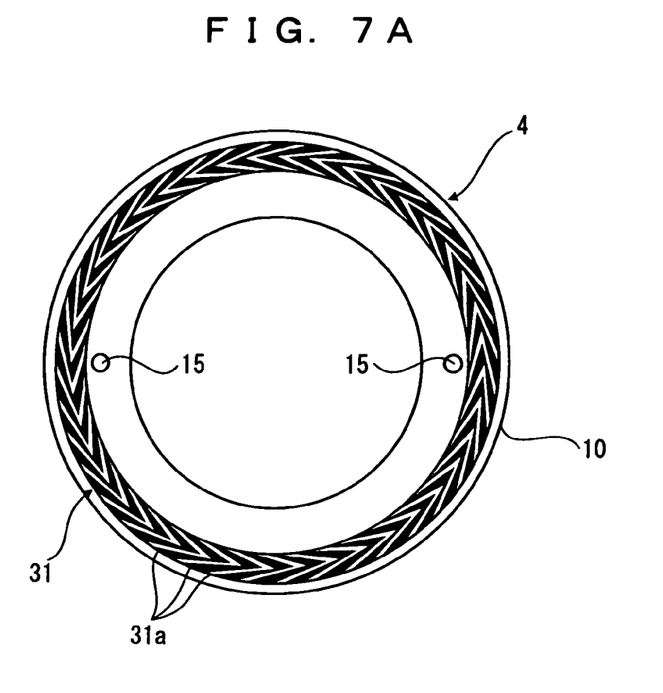
FIG. 7A is a view showing a lower end face of the sleeve of the hydrodynamic bearing device, wherein a thrust dynamic pressure generating groove of a herringbone shape is formed.
Figure 7B:
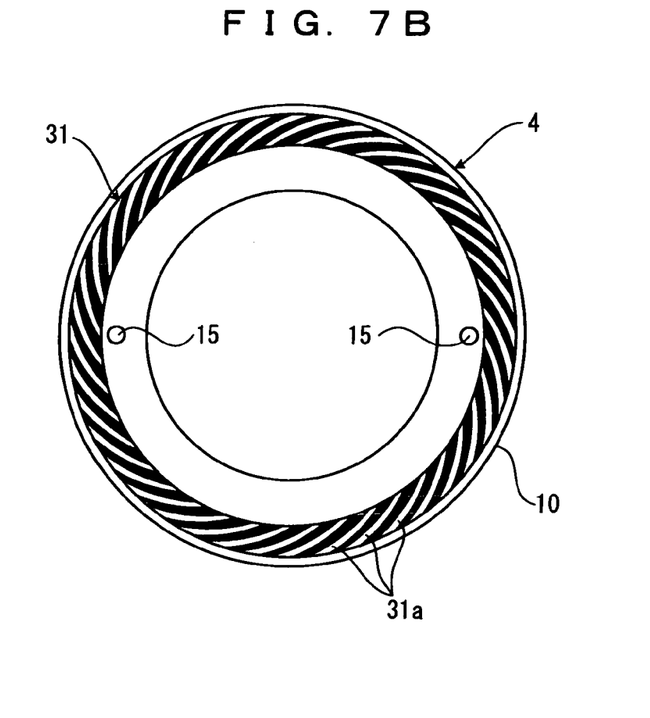
FIG. 7B is a view showing a lower end face of the sleeve of the hydrodynamic bearing device, wherein a thrust dynamic pressure generating groove of a spiral shape is formed.

A thrust bearing 31 is provided at the lower end face (one end face) of the sleeve 4. As shown in FIG. 7, the thrust bearing 31 generates a thrust load supporting pressure through the action of the thrust dynamic pressure generating groove 31a formed at the lower end face of the sleeve 4. As shown in FIG. 2, the thrust bearing 31 is provided on the outer side in the radial direction than the communication hole 15. The shape of the thrust dynamic pressure generating groove 31a may be a herringbone shape as shown in FIG. 7(a) or a spiral shape as shown in FIG. 7(b) and the like.

The operation of the above configuration will now be explained.

The sleeve 4 is integrally rotated with the hub 5 by sequentially energizing the stator 7, where the radial load is supported by a pair of radial bearings 28, 29, and the thrust load is supported by the thrust bearing 31. The sleeve 4 is rotated in a non-contacting manner and at low vibration. Normally, rotation in a non-contacting manner is carried out with the outer collar part 10 fitted into the inner groove 12, but when disturbances such as vibration or impact exceeding the attraction force produced between the magnet 6 and the base 2 is applied, the outer collar part 10 engages the inner collar part 11b in the slip-out direction D thereby preventing the sleeve 4 from slipping out outward (upward) from the other end portion of the fixed shaft 3.

The slip-out prevention of the sleeve 4 is performed by the inner collar part 11b of the slip-out preventing member 11 fixed to the base 2 and the outer collar part 10 formed at the outer periphery of the sleeve 4. Thus, the components provided in the direction of the shaft center 8 are only the base 2, the sleeve 4, and the cover part 5a of the hub 5. Thus, even if the outer collar part 10 and the inner collar part 11b are provided, the formable height H (equivalent to the height of the inner peripheral surface of the sleeve 4 or the height of the outer peripheral surface of the body shaft part 3a of the fixed shaft 3) of the radial bearings 28, 29 is not reduced and the formable height H of the radial bearings 28, 29 is secured to a sufficient size, as shown in FIG. 2. Since the strength necessary for preventing slip-out is ensured by the inner collar part 11b of the slip-out preventing member 11 and the outer collar part 10 of the sleeve 4, the thickness of the cover part 5a of the hub 5 can be reduced. Therefore, the spacing S (span) between one radial bearing 28 and the other radial bearing 29 in the vertical direction (i.e., direction in the shaft center 8 of the fixed shaft 3) can be sufficiently secured compared to the example of prior art, and stiffness with respect to disturbances such as vibration, impact and the like is enhanced.

As shown in FIG. 6, since the radial dynamic pressure generating groove 28a of the upper radial bearing 28 has an asymmetrical shape in which the width A is longer than the width B, the dynamic pressure also acts from the bottom to the top when the sleeve 4 is rotated. Thus, as shown with an arrow in a dotted line in FIG. 2, the operating oil 16 flows in the order of, flowing upward in the first gap 21, flowing from the upper end of the first gap 21 into the inner end in the radial direction of the fourth gap 24, flowing through the fourth gap 24 from the inner side towards the outer side in the radial direction by the centrifugal force, flowing from the fourth gap 24 into the upper end of the communication hole 15, flowing through the communication hole 15 downward, flowing from the lower end of the communication hole 15 into the second gap 22, and flowing from the second gap 22 into the lower end of the first gap 21, and circulates. Thus, air bubbles generated or mixed in the radial bearings 28 and 29 and the thrust bearing 31 are discharged to the sixth gap 26 when reaching the upper end (other end) of the sleeve 4 through the circulation path formed by the first gap 21, the fourth gap 24, the communication hole 15, and the second gap 22, and further discharged outside through the penetration hole 14 of the hub 5 from the sixth gap 26. The air bubbles thus do not remain in the bearings 28, 29, 31.

Since the operating oil 16 is subjected to the force of flow through the fourth gap 24 from the inner side towards the outer side in the radial direction by the centrifugal force, the circulating force of the operating oil 16 is further increased.

The oil pressure in the second gap 22 and the oil pressure in the fourth gap 24 are balanced by the communication hole 15, and the first gap 21 is communicated to the second and the fourth gaps 22, 24. Thus the pressure difference between the thrust bearing 31 in the second gap 22 and the radial bearings 28, 29 in the first gap 21 is reduced, and leakage of the operating oil 16 is prevented.

As shown in FIG. 3, the sixth gap 26 is gradually narrowed from the inner peripheral side towards the outer peripheral side (i.e., from the penetration hole 14 of the hub 5 to the upper end portion of the first gap 21). Thus, a force in the direction the area of the interface 16a (air/liquid interface) becomes smaller, that is, from the inner peripheral side towards the outer peripheral side acts on the interface 16a of the operating oil 16 in the sixth gap 26 by surface tension (i.e., capillary phenomenon). This force is the same for when the sleeve 4 is rotating or is stopped. Further, when the hub 5 integrally rotates with the sleeve 4, a force from the inner peripheral side towards the outer peripheral side (i.e., from the penetration hole 14 of the hub 5 to the upper end portion of the first gap 21) acts on the operating oil 16 contacting the inclined surface 5b in the sixth gap 26 by the centrifugal force. Therefore, when the sleeve 4 is rotating, the balance with the operating oil 16 attempting to leak out from the sixth gap 26 is maintained by the surface tension and the centrifugal force, and the operating oil 16 in the sixth gap 26 is prevented from leaking outside from the penetration hole 14.

As shown in FIG. 4, the fifth gap 25 is gradually narrowed from the open end towards the third gap 23. Thus, a force in the direction the area of the interface 16b becomes smaller, that is, from the open end towards the third gap 23 acts on the interface 16b of the operating oil 16 in the fifth gap 25 by surface tension (i.e., capillary phenomenon). This force is the same for when the sleeve 4 is rotating or is stopped. Further, when the sleeve 4 is rotated, a force towards the outer peripheral side acts on the operating oil 16 contacting the inclined surface 4a in the fifth gap 25 by the centrifugal force. The operating oil 16 in the fifth gap 25 thus attempts to move towards the third gap 23 on the base 2 side. Therefore, when the sleeve 4 is rotating, the balance with the operating oil 16 attempting to leak out from the fifth gap 25 is maintained by the surface tension and the centrifugal force, and the operating oil 16 in the fifth gap 25 is prevented from leaking outside from the open end on the hub 5 side.

As shown in FIG. 2, since the thrust bearing 31 is formed closer to the outer side in the radial direction (closer to the outer diameter side) of the sleeve 4, a stable bearing is configured for the swinging of the sleeve 4 with respect to the fixed shaft 3.

Since the hub 5 is formed including the cover part 5a that covers the upper end face of the sleeve 4, the thickness of the cover part 5a can be made thin as described above, and the fourth gap 24 serving as the oil reservoir part can be formed between the cover part 5a and the upper end face of the sleeve 4. Space is thereby saved and longer life space is achieved. The space is effectively used since the component configuration of the bearing device is the base 2, the fixed shaft 3, the sleeve 4, and the hub 5.

When the rotation of the sleeve 4 is stopped by deenergizing the stator 7, the lower end of the sleeve 4 contacts the base 2 by the attraction force between the magnet 6 and the base 2, and comes to rest at a stable position. Thus, the position in the direction of the shaft center 8 of the sleeve 4 is restricted by the attraction force generated by the magnet 6 and the base 2. If the material of the base 2 is not a magnetic material, a disc shaped thin plate of a magnetic material is attached to the base 2, and the thin plate is provided at a position facing the distal end surface of the magnet 6 to generate the attraction force.

A method of assembling the bearing device will now be explained.

First, the fixed shaft 3 is attached to the base 2 through press-fit adhering or laser welding and the like. Next, the sleeve 4 is externally fitted to the fixed shaft 3 from above, and thereafter, the slip-out preventing member 11 is externally fitted to the sleeve 4 from above, and the slip-out preventing member 11 is attached to the base 2 by press-fit adhering or laser welding and the like. The hub 5 is attached to the upper end portion of the sleeve 4 by press-fit adhering or laser welding and the like, and the operating oil 16 is poured into each gap 21 to 26 and the communication hole 15. Excess operating oil 16 is then wiped off, and adjustment of the interfaces 16a, 16b is then performed.

Thus, since assembly is completed by simply placing each member in order from above, the assembly task is facilitated.

One example of the dimension and the material of each part of the bearing device will now be shown.

Figure 3B:
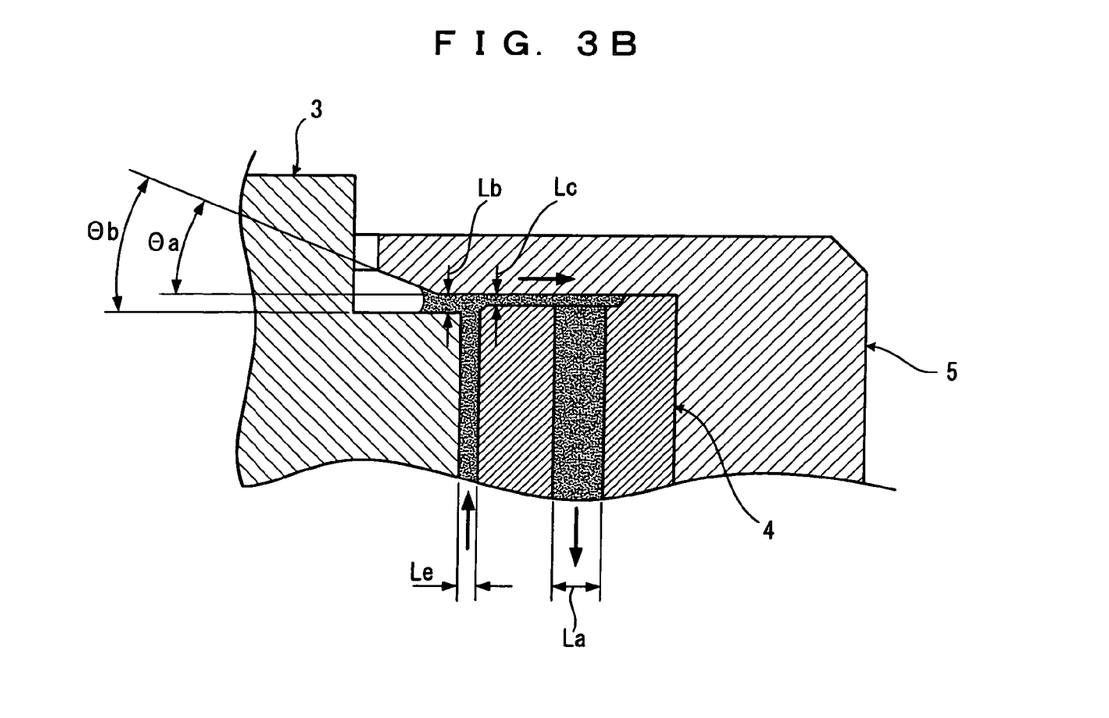
FIG. 3B is a view showing dimensions of the respective parts of the portion shown in FIG. 3A.

As shown in FIG. 3(b), the diameter La of the communication hole 15 is about φ 0.2 to 0.4 mm. The distance Lb in the vertical direction between the stepped surface 3c of the fixed shaft 3 and the lower surface of the cover part 5a of the hub 5 is about 0.08 to 0.12 mm. The distance Lc in the vertical direction (i.e., spacing in the vertical direction of the fourth gap 24) between the lower surface of the cover part 5a of the hub 5 and the upper end face of the sleeve 4 is about 0.04 to 0.06 mm. The gap Le of the radial bearing (i.e., spacing in the radial direction of the first gap 21) is about 0.003 mm. The relationship Lb>Lc and Lc>Le is met.

Figure 4B:
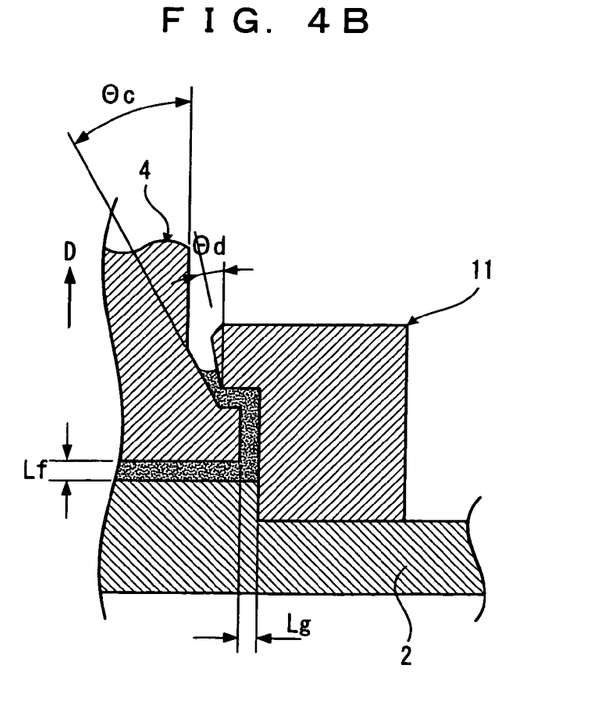
FIG. 4B is a view showing dimensions of the respective parts of the device shown in FIG. 4A.

As shown in FIG. 4B, the gap Lf of the thrust bearing (i.e., spacing in the vertical direction of the second gap 22) is about 0.02 to 0.04 mm. The gap Lg in the radial direction between the outer peripheral surface of the outer collar part 10 of the sleeve 4 and the inner peripheral surface of the toric part 11a of the slip-out preventing member 11 is about 0.1 mm. The angle of inclination θa of the inclined surface 5b of the hub 5 is about 10°. The angle of inclination θc of the inclined surface 4a of the sleeve 4 is an angle that determines the force to be received from the centrifugal force, and is about 10°. The angle θb formed by the inclined surface 5b of the hub 5 and the stepped surface 3c of the fixed shaft 3 is desirably about 10 to 20°. The angle of inclination θd of the inner peripheral surface 11c of the slip-out preventing member 11 is desirably an angle in which the inner diameter increases towards the base 2 side.

A suitable martensite stainless steel is used for the material of the fixed shaft 3 and the hub 5. A combination of martensite stainless steel and nickel plating is used for the material of the sleeve 4. The stainless steel is used for the material of the slip-out preventing member 11. The combination of molding iron and steel nickel plating is used for the material of the base 2.

In the first embodiment, as shown in FIG. 2, the radial dynamic pressure generating grooves 28a, 29a are formed on the inner peripheral surface of the sleeve 4, the thrust dynamic pressure generating groove 31a is formed at the lower end face of the sleeve 4 and on the outer side in the radial direction than the communication hole 15, but are not limited thereto depending on the required bearing performance, and may be formed as in the second to the sixth embodiments explained below.

That is, in the second embodiment, the radial dynamic pressure generating grooves 28a, 29a are formed on the inner peripheral surface of the sleeve 4, and the thrust dynamic pressure generating groove 31a is formed on the lower end face of the sleeve 4 and on the inner side in the radial direction than the communication hole 15.

In the third embodiment, the radial dynamic pressure generating grooves 28a, 29a are formed on the inner peripheral surface of the sleeve 4, and the thrust dynamic pressure generating groove 31a is formed on the lower end face of the sleeve 4 and on both the outer side and the inner side in the radial direction than the communication hole 15.

In the fourth embodiment, the radial dynamic pressure generating grooves 28a, 29a are formed on the outer peripheral surface of the body shaft part 3a of the fixed shaft 3, and the thrust dynamic pressure generating groove 31a is formed on the lower end face of the sleeve 4 and on the outer side in the radial direction than the communication hole 15.

In the fifth embodiment, the radial dynamic pressure generating grooves 28a, 29a are formed on the outer peripheral surface of the body shaft part 3a of the fixed shaft 3, and the thrust dynamic pressure generating groove 31a is formed on the lower end face of the sleeve 4 and on the inner side in the radial direction than the communication hole 15.

In the sixth embodiment, the radial dynamic pressure generating grooves 28a, 29a are formed on the outer peripheral surface of the body shaft part 3a of the fixed shaft 3, and the thrust dynamic pressure generating groove 31a is formed on the lower end face of the sleeve 4 and on both the outer side and the inner side in the radial direction than the communication hole 15.

The radial dynamic pressure generating grooves 28a, 29a are formed on only one of either the inner peripheral surface of the sleeve 4 or the outer peripheral surface of the body shaft part 3a of the fixed shaft 3 in the first to the sixth embodiments, but may be formed on both.

The thrust dynamic pressure generating grooves 31a is formed on the lower end face of the sleeve 4 in the first to the sixth embodiments, but may be formed on the upper surface of the base 2 facing the lower end face of the sleeve 4. Further, the thrust dynamic pressure generating groove 31a may be formed on both the lower end face of the sleeve 4 and the upper surface of the base 2.

The hub 5 may be divided into two pieces of the bearing part on the inner peripheral portion and the disc mounting part on the outer side thereof. Similarly, the base 2 may be divided into two pieces of the bearing part and the portion on the outer side thereof.

Figure 8:
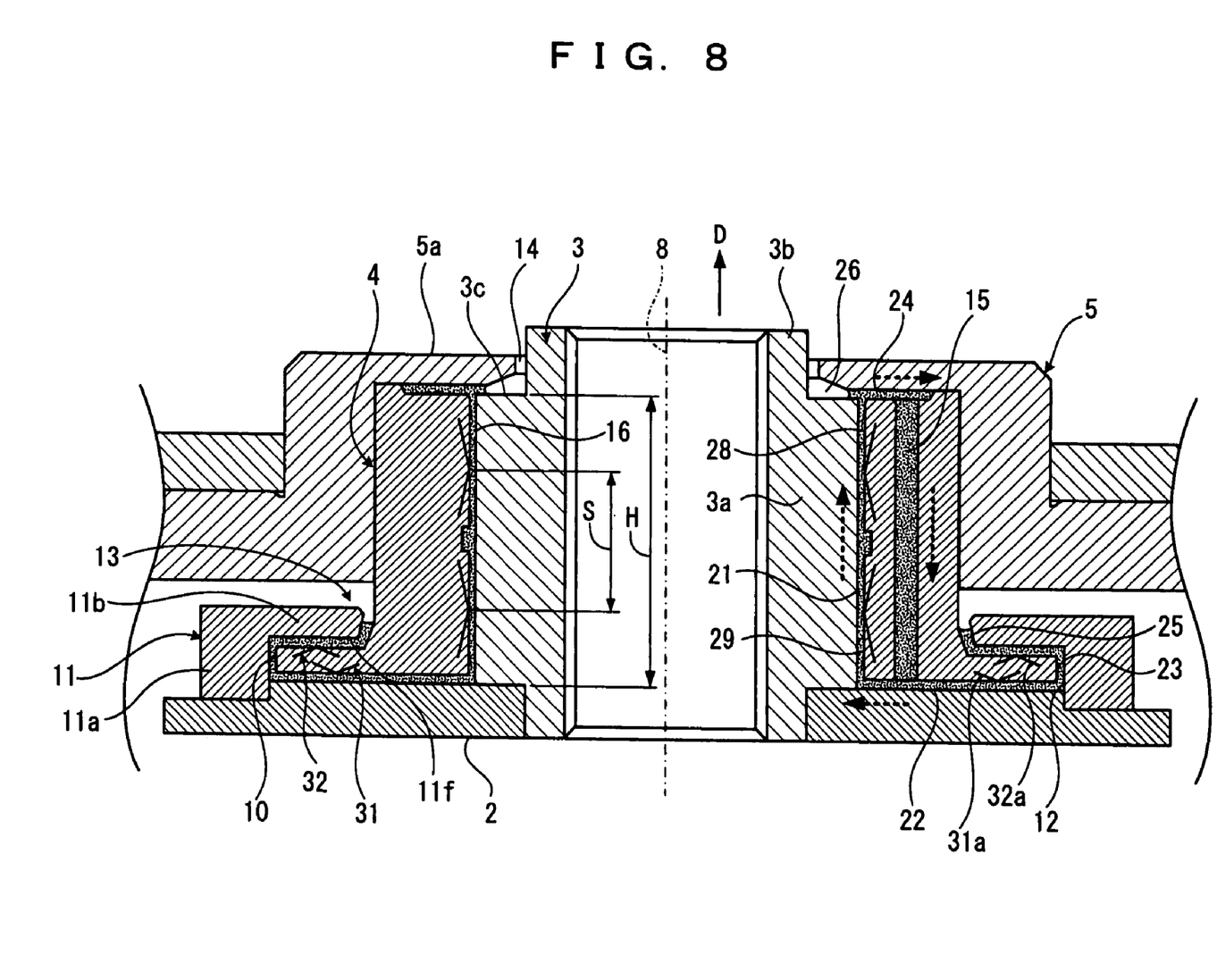
FIG. 8 is an enlarged cross sectional view of a portion of a hydrodynamic bearing device of a spindle motor according to a seventh embodiment of the present invention.

The seventh embodiment will now be described based on FIG. 8.

The outer collar part 10 of the sleeve 4 is extended outward in the radial direction compared to that in the first embodiment. The thrust dynamic pressure generating groove 31a is formed on the lower end face of the sleeve 4 and forms the thrust bearing 31. Further, of the pair of surfaces facing each other in the direction of the shaft center 8, the outer collar part 10 of the sleeve 4 and the inner collar part 11b of the slip-out preventing member 11, a separate thrust dynamic pressure generating groove 32a is formed on the upper surface of the outer collar part 10 to form a separate thrust bearing 32.

Accordingly, the separate thrust bearing 32 supports the thrust load acting in the slip-out direction D of the sleeve 4. The thrust bearing 31 supports the thrust load acting in the direction opposite the slip-out direction D of the sleeve 4. Further, the separate thrust bearing 32 regulates the position in the direction of the shaft center 8 of the sleeve 4.

In the seventh embodiment, the separate thrust dynamic pressure generating grove 32a is formed on the upper surface of the outer collar part 10, but a separate thrust dynamic pressure generating groove 32a may be formed on the inner bottom surface 11f of the inner collar part 11b of the pair of surfaces facing each other in the direction of the shaft center 8, the outer collar part 10 and the inner collar part 11b. Moreover, a separate thrust dynamic pressure generating groove 32a may be formed on both the upper surface of the outer collar part 10 and the inner bottom surface 11f of the inner collar part 11b.

In the first to the seventh embodiments, two radial bearings 28, 29 are formed in the direction of the shaft center 8, as shown in FIG. 2, but only one may be formed, or may be formed in pluralities of three or more.

In the first to the seventh embodiments, the communication hole 15 is formed at two locations of the sleeve 4, as shown in FIG. 5, but may be formed at one location or at three or more locations.

In the first to the seventh embodiments, only the radial dynamic pressure generating groove 28a of the upper radial bearing 28 is formed into an asymmetrical shape, as shown in FIG. 6, but only the radial dynamic pressure generating groove 29a of the lower radial bearing 29 may be similarly formed into an asymmetrical shape, or both radial dynamic pressure generating grooves may be formed into an asymmetrical shape.

An eighth embodiment will now be explained based on FIG. 9.

Figure 9:
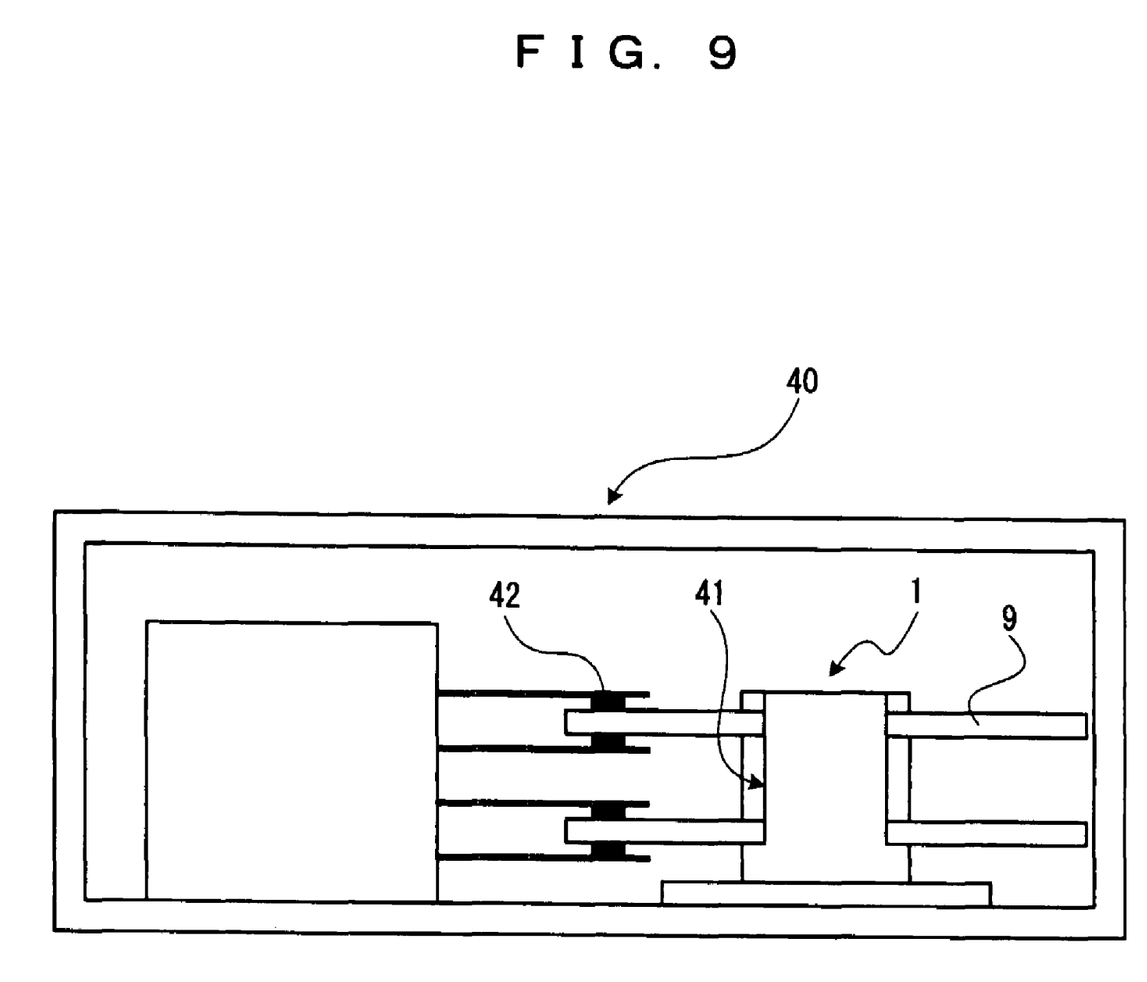
FIG. 9 is a view of a recording and reproducing apparatus mounted with the spindle motor including a hydrodynamic bearing device according to an eighth embodiment of the present invention.

FIG. 9 shows a recording and reproducing apparatus 40 mounted with the spindle motor 1 according to the first to the seventh embodiments. The spindle motor 1 includes the hydrodynamic bearing device 41 explained in the first to the seventh embodiments, a recording disc 9 and the like.

The recording and reproducing apparatus 40 includes a magnetic head 42. The information recorded on the disc 9 is reproduced or the information is recorded on the disc 9 with the magnetic head 42. A compact recording and reproducing apparatus 40 of high reliability is thereby provided.

The present invention is applicable to the hydrodynamic bearing device using operating fluid such as lubricating oil and the like. This hydrodynamic bearing device has high reliability suited for miniaturization and thinning for the recording medium control device. The recording medium includes an optical recording medium, an optical magnetic recording medium, a magnetic recording medium and the like. The form of medium includes disc, tape and the like. Further, the location where the hydrodynamic bearing device is used includes a disc driving apparatus, a reel driving apparatus, a capstan driving apparatus, a drum driving apparatus and the like.

What is claimed is:

1. A hydrodynamic bearing device, comprising:
   a fixed shaft;
   a base fixed to a first end portion of the shaft;
   a bearing body comprising a cylindrical sleeve, the bearing body surrounding an outer peripheral surface of the shaft and rotatably supported by the shaft;
   a hub fixed to the bearing body and having a hole therein, the shaft being located in said hole in said hub;
   at least one radial bearing having a first gap between the outer peripheral surface of the shaft and an inner peripheral surface of the bearing body and having a radial dynamic pressure generating groove in at least one of the outer peripheral surface of the shaft and the inner peripheral surface of the bearing body;
   a thrust bearing having a second gap between a first end face of the bearing body and the base and having a thrust dynamic pressure generating groove in at least one of a first end face of the bearing body and a surface of the base facing the first end face of the bearing body, the gaps of the radial bearing and the thrust bearing being connected and filled with an operating fluid;
   a slip-out preventing device for preventing the bearing body from slipping out in an axial direction away from the base past a predetermined point, the slip-out preventing device including a first side engaging part on the outer peripheral surface of the bearing body, said first side engaging part rotatable with the bearing body and comprising an outer collar part, and a fixed second side engaging part on the base, said fixed second side engaging part comprising an annular slip-out preventing member including an inner collar part on an inner periphery of the fixed second side engaging part, the second side engaging part for preventing the first side engaging part from slipping out in an axial direction away from the base, thereby preventing the bearing body from moving in such axial direction;
   a third gap between the outer collar part of the sleeve and the inner peripheral surface of the slip-out preventing member, the third gap connected to the second gap;
   wherein the hub is located on a second end face of the bearing body opposite the first end face of the bearing body;
   an annular inner groove located between the inner collar part and the base;
   the hub comprising a cover part covering the second end face of the bearing body along a periphery of the hole;
   a fourth gap connected to the first gap located between the cover part and the second end face of the bearing body; and
   operating fluid filling the third and fourth gaps.

2. The hydrodynamic bearing device according to claim 1, wherein a communication hole connecting the second gap and the fourth gap is located in the bearing body, and operating fluid fills the communication hole.

3. The hydrodynamic bearing device according to claim 2, wherein
   an inclined surface facing the inner peripheral surface of the inner collar part is located on the outer peripheral surface of the bearing body, the inclined surface having an outer diameter gradually increasing towards the base and reaching the outer collar part;
   a fifth gap is between the inner peripheral surface of the inner collar part and the inclined surface of the bearing body, the fifth gap having a width gradually narrowing in a radial direction from an open end on the hub side of the slip-out preventing member towards the base side, the fifth gap connected to the third gap at the base side thereof; and
   operating fluid is present in the fifth gap.

4. The hydrodynamic bearing device according to claim 3, wherein
   the fixed shaft includes a body shaft part, a distal end shaft part, and a stepped surface;
   the distal end shaft part is at a distal end of the body shaft part, and has a diameter smaller than the body shaft part;
   the stepped surface is between the outer peripheral surface of the main shaft part and the outer peripheral surface of the distal end shaft part;
   the distal end of the fixed shaft is located in the hole of the hub;
   an inclined surface facing the stepped surface of the fixed shaft in the direction of the shaft center is at the cover part of the hub, inclined surface inclining so as to gradually increase an inner diameter thereof towards the base;
   a sixth gap is between the inclined surface of the hub and the stepped surface of the fixed shafts, the sixth gap is connected to the first gap at an outer peripheral side thereof and connected to the hole of the hub at an inner peripheral side thereof, the sixth gap having a width gradually narrowing in the direction of the shaft center from the inner peripheral side towards the outer peripheral side; and operating fluid is present in the sixth gap.

5. The hydrodynamic bearing device according to claim 4, wherein the interface of the operating fluid present in the sixth gap is balanced with a pressure inside the bearing by surface tension and centrifugal force, when the sleeve is rotating.

6. The hydrodynamic bearing device according to claim 3, wherein the interface of the operating fluid present in the fifth gap is balanced with a pressure inside the bearing by surface tension and centrifugal force, when the sleeve is rotating.

7. The hydrodynamic bearing device according to claim 2, wherein the radial dynamic pressure generating groove of the at least one radial bearing has an asymmetrical shape that generates a dynamic pressure for circulating the operating fluid from the first gap through the fourth gap, the communication hole, the second gap, and to the first gap, in this order.

8. The hydrodynamic bearing device according to claim 1, wherein another thrust bearing formed with a thrust dynamic pressure generating groove is located on at least one of the surfaces of the outer collar part of the sleeve and the inner collar part of the slip-out preventing member, the surfaces facing each other.

9. A spindle motor including the hydrodynamic bearing device according to claim 1.

10. A recording and reproducing apparatus including the spindle motor according to claim 9.

* * * * *